United States Patent [19]

Kimura et al.

[11] 4,018,047
[45] Apr. 19, 1977

[54] EXHAUST REACTION APPARATUS FOR INTERNAL COMBUSTION ENGINE HAVING IN-LINE CYLINDERS

[75] Inventors: Kenji Kimura, Wako; Takao Kajiware, Saitama, both of Japan

[73] Assignee: Honda Giken Kogyo Kabushiki Kaisha, Tokyo, Japan

[22] Filed: Nov. 28, 1975

[21] Appl. No.: 635,929

[30] Foreign Application Priority Data

Dec. 3, 1974  Japan .......................... 49-137719

[52] U.S. Cl. .................................. 60/282; 60/323
[51] Int. Cl.² ............................................ F01N 3/10
[58] Field of Search ............................ 60/282, 323

[56] References Cited
UNITED STATES PATENTS

| 2,257,631 | 9/1941 | Wahlberg | 60/323 |
| 3,302,394 | 2/1967 | Pahnke | 60/282 |

*Primary Examiner*—Douglas Hart
*Attorney, Agent, or Firm*—Lyon & Lyon

[57] ABSTRACT

An internal combustion engine having a plurality of in-line cylinders is provided with a series of exhaust pipes each connected to receive exhaust gases from two cylinders of different exhaust timing. A first reaction chamber receives exhaust gases from each of the exhaust pipes. A second reaction chamber surrounds and encloses the first reaction chamber and said exhaust pipes. A deflector within the second reaction chamber extends continuously from a position adjacent the entrance end of the exhaust pipe at one end of the series to a position adjacent the entrance end of another exhaust pipe at the other end of the series, the deflector acting to cause exhaust gases moving through the second reaction chamber to pass over the major portion of the lengths of each of the exhaust pipes. Oxygen-rich exhaust gases from the engine are held at a high temperature for long residence time to oxidize HC and CO and thereby minimize the quantity of these pollutants discharged into the atmosphere.

3 Claims, 2 Drawing Figures

EXHAUST REACTION APPARATUS FOR INTERNAL COMBUSTION ENGINE HAVING IN-LINE CYLINDERS

This invention relates to internal combustion engines and is particularly directed to improvements in exhaust gas reaction apparatus for oxidizing HC and CO in order to minimize the quantity of these pollutants discharged into the atmosphere. This invention finds particular usefulness when the exhaust gases are oxygen-rich as a result of operating the engine on an overall air-fuel ratio leaner than the stoichiometric ratio. By way of illustration, this invention will be described in connection with a three-valve, prechamber, torch ignition engine having a plurality of in-line cylinders.

If the engine has six cylinders in-line and if three exhaust pipes are employed each connected to receive exhaust gases from two cylinders of different exhaust timing, and if all of the exhaust pipes are connected to a single exhaust reaction chamber, the first and third exhaust pipes at the ends of the series are longer than the second exhaust pipe in the middle. The longer exhaust pipes ordinarily produce a greater drop in temperature. If a second reaction chamber is provided to surround and enclose the first reaction chamber, the gases discharged from the first to the second reaction chamber do not insure maintenance of the first and third exhaust pipes at the ends of the series at as high temperature as the middle exhaust pipe between them. This is true even though the second reaction chamber also surrounds and encloses the exhaust pipes themselves, because the exhaust gas tends to move along the shortest distance with the least resistance to flow, and hence the inlet ends of the longer exhaust pipes are not heated as well from the second reaction chamber as the inlet end of the shorter middle exhaust pipe. The temperature drop at the inlet ends of the longer exhaust pipes has an adverse effect on the efficiency of the exhaust gas reaction system in oxidizing CO and HC.

In accordance with this invention, the portions of each of the exhaust pipes near its respective inlet end receive heat from the second reaction chamber by reason of the provision of a deflector which is secured to the outside of the walls forming the first reaction chamber and is secured to the inside of the walls forming the second reaction chamber, the deflector extending continuously from a position adjacent the inlet end of the exhaust pipe at one end of the services to a position adjacent the inlet end of another exhaust pipe at the other end of the series. The deflector acts to cause exhaust gases in the second reaction chamber to pass over the major portion of the lengths of each of the exhaust pipes.

Other and more detailed objects and advantages will appear hereinafter.

Figure 1:
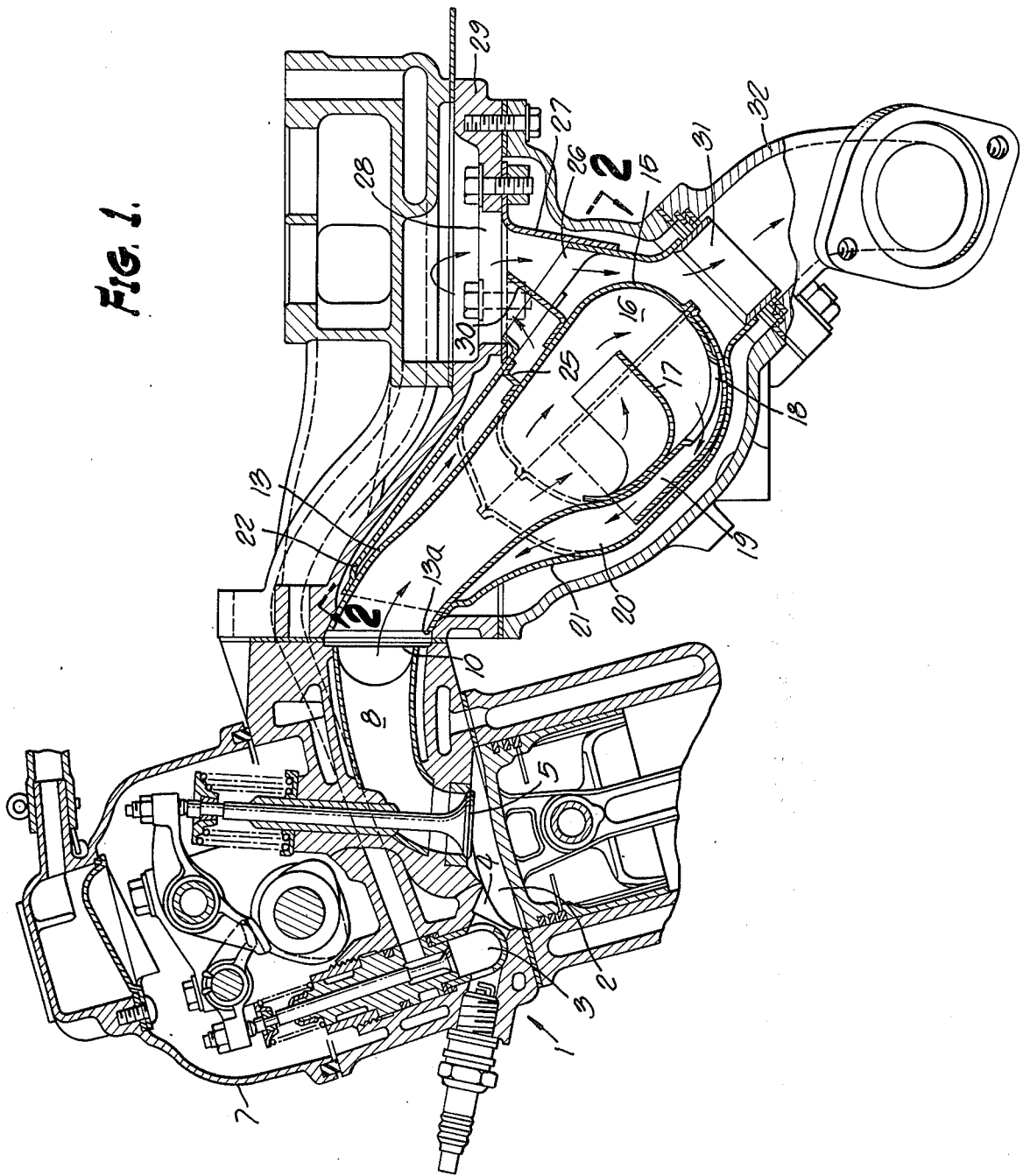
FIG. 1 is a sectional elevation showing a preferred embodiment of this invention.
Figure 2:
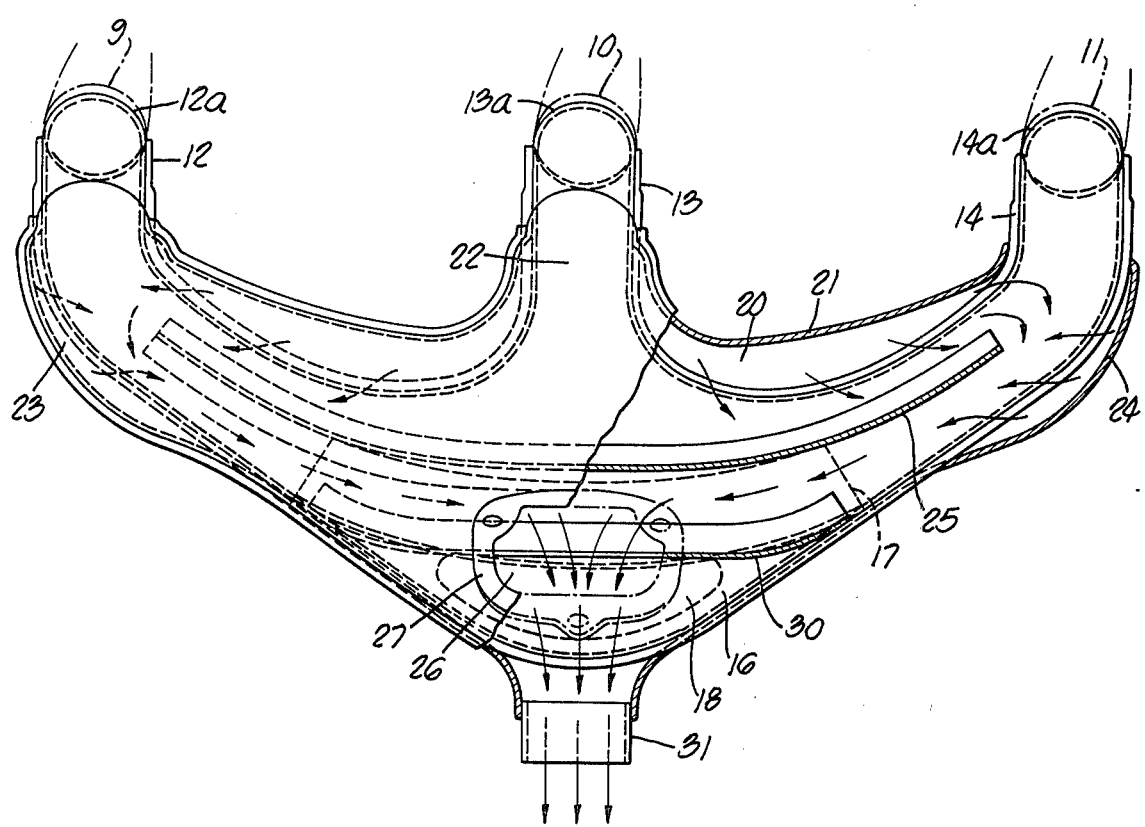
FIG. 2 is a view partly broken away taken substantially on the lines 2—2 as shown on FIG. 1.

Referring to the drawings, the internal combustion engine generally designated 1 has six cylinders in-line each being provided with a main combustion chamber 2 and an auxiliary combustion chamber 3 connected by a torch opening 4. An exhaust valve 5 for each cylinder controls the discharge of exhaust gases through an exhaust passage 8 in the cylinder head 7. Adjacent pairs of cylinders of different exhaust timing discharge into spaced exhaust ports 9, 10 and 11.

In accordance with this invention, a series of exhaust pipes 12, 13 and 14 are provided, one for each pair of exhaust passages 8, each exhaust pipe having an inlet end 12a, 13a and 14a, respectively. These exhaust pipes are formed integrally with and merge into walls 15 which define a first reaction chamber 16. The exhaust pipes 12 and 14 at the ends of the series are equal in length while the exhaust pipe 13 in the middle of the series is shorter. The exhaust pipes and the walls 15 forming the first reaction chamber 16 are formed of thin metal. A baffle 17 is mounted within the first reaction chamber 16 and arranged to deflect exhaust gases toward one side of the first reaction chamber. A discharge opening 18 in the walls 15 is located on the opposite side of the first reaction chamber and serves to discharge exhaust gases through the space 19 and into the interior of the second reaction chamber 20 formed by the thin metal walls 21.

The second reaction chamber 20 has a wall portion 22 which surrounds and encloses the short exhaust pipe 13, and also has laterally extending wall portions 23 and 24 which surround and enclose the long exhaust pipes 12 and 14. These wall portions 22, 23 and 24 are formed of thin metal.

A deflector 25 is secured to the outside of the walls 15 forming the first reaction chamber and secured to the inside of the walls 21, 23 and 24 forming the second reaction chamber 20. This deflector 25 extends continuously from a position adjacent the inlet end of the exhaust pipe 12 to a position adjacent the inlet end of the exhaust pipe 14. The deflector causes exhaust gases in the second reaction chamber 20 to divide and flow left and right to pass over the major portion of the lengths of each of the exhaust pipes 12, 13 and 14.

An opening 26 is provided in the walls 21 of the second reaction chamber 20. A flanged connector duct 27 serves to place the opening 26 in communication with the downward facing opening 28 in the thick wall housing 29. A baffle 30 is fixed in the opening 26 extends into the connector duct 27 to direct the flow of exhaust gases from the second reaction chamber 20 through the opening 28 for heating air-fuel intake mixtures prior to delivery to the main combustion chambers 2 and the auxiliary combustion chambers 3. Exhaust gases leave the assembly through the discharge pipe 31 and tail pipe 32.

From the foregoing description it will be understood that the second reaction chamber which surrounds the first reaction chamber is formed to extend along the outer exhaust pipes to enclose them. A deflector is provided within the second reaction chamber and extends along the outside of the first reaction chamber to guide exhaust gases so that the temperature drop that would otherwise occur in the vicinity of the inlet ends of the relatively long exhaust pipes is minimized for improved efficiency of exhaust reaction.

Having a described our invention, it is to be understood that we are not to be limited to the details herein set forth but that our invention is of the full scope of the appended claims.

We claim:

1. For use with an internal combustion engine which discharges exhaust gases from a plurality of in-line cylinders, the improvement comprising, in combination: a series of exhaust pipes each having an inlet end connected to receive exhaust gases from said cylinders, walls forming a first reaction chamber connected to receive exhaust gases from each of said exhaust pipes, walls forming a second reaction chamber surrounding and enclosing said first reaction chamber and surrounding and enclosing each of said exhaust pipes, means for discharging exhaust gases from the first reaction chamber into the second reaction chamber, and a deflector secured to the outside of the walls forming said first reaction chamber and secured to the inside of the walls forming the second reaction chamber, said deflector extending continuously from a position adjacent the inlet end of the exhaust pipe at one end of the series to a position adjacent the inlet end of another exhaust pipe at the other end of said series, said deflector extending along the exhaust pipes at both ends of said series, said deflector acting to cause exhaust gases in said second reaction chamber to divide and flow left and right and to pass over the major portion of the length of each of the exhaust pipes.

2. For use with an internal combustion engine which discharges exhaust gases from six in-line cylinders the improvement comprising, in combination: first, second and third exhaust pipes each having an inlet end connected to receive exhaust gases from two cylinders of different exhaust timing, the first and third exhasut pipes having the same lenth and the second exhaust pipe being shorter, walls froming a first reaction chamber connected to recieve exhaust gases from each of said exhaust pipes, walls forming a second rection chamber surrounding and enclosing said first reaction chamber and surrounding and enclosing each of said exhaust pipes, means for discharging exhaust gases from the first reaction chamber into the second reaction chamber, and a deflector secured to the outside of the was forming said first reaction chamber and secrued to the inside of the walls forming the second reaction chamber, said deflector extending continuously from a position adjacent the inlet end of the first exhaust pipe to a position adjacent the inlet end of the third exhaust pipe and acting to cause exhaust gases in said second reaction chamber to pass over the major portion of the lengths of all three exhaust pipes.

3. For use with an internal combustion engine which discharges exhaust gases from a plurality of in-line cylinders, the improvement comprising, in combination: a series of exhaust pipes each having an inlet end connected to receive exhaust gases from said cylinders, walls forming a first reaction chamber connected to receive exhaust gases from each of said exhaust pipes, walls forming a second reaction chamber surrounding and enclosing said first reaction chamber and surrounding and enclosing each of said exhaust pipes, means for discharging exhaust gases from the first reaction chamber into the second reaction chamber, and a deflector secured to the outside of the walls forming said first reaction chamber and secured to the inside of the walls forming the second reaction chamber, said deflector extending continuously from a position adjacent the inlet end of the exhaust pipe at one end of the series to a position adjacent the inlet end of another exhaust pipe at the other end of said series, said deflector forming a barrier impeding the flow of exhaust gases near the center of the series and causing the exhaust gases in said second reaction chamber to be routed laterally left and right toward the ends of said series and thus to pass over the major portion of the length of each of the exhaust pipes.

* * * * *

UNITED STATES PATENT AND TRADEMARK OFFICE
CERTIFICATE OF CORRECTION

PATENT NO. : 4,018,047
DATED     : April 19, 1977
INVENTOR(S) : KENJI KIMURA et al It is certified that error appears in the above-identified patent and that said Letters Patent are hereby corrected as shown below:

Please correct the spelling of the last name of one of the inventors to --Kajiwara--.

Claim 2, line 21, place a comma after "cylinders".

line 26, "length" is misspelled.

line 27, "froming" should read --forming--.

line 28, "receive" is misspelled.

line 29, "rection" should read --reaction--.

line 1 (second column), "was" should read --walls--.

line 2 (second column), "crued" should read --cured--.

Signed and Sealed this

Twenty-eighth Day of June 1977

[SEAL]

Attest:

RUTH C. MASON
*Attesting Officer*

C. MARSHALL DANN
*Commissioner of Patents and Trademarks*